United States Patent
Glugla et al.

(10) Patent No.: US 9,476,375 B2
(45) Date of Patent: *Oct. 25, 2016

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); Michael Mancini, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

This patent is subject to a terminal disclaimer.

(21) Appl. No.: 14/197,066

(22) Filed: Mar. 4, 2014

(65) Prior Publication Data

US 2014/0188374 A1  Jul. 3, 2014

Related U.S. Application Data

(63) Continuation of application No. 13/197,284, filed on Aug. 3, 2011, now Pat. No. 8,666,637.

(51) Int. Cl.
| | |
|---|---|
| *F02D 41/22* | (2006.01) |
| *F02D 41/14* | (2006.01) |
| *F02D 41/00* | (2006.01) |
| *F02D 41/04* | (2006.01) |
| *F02P 5/152* | (2006.01) |

(Continued)

(52) U.S. Cl.
CPC ......... *F02D 41/1498* (2013.01); *F02D 35/027* (2013.01); *F02D 41/0002* (2013.01); *F02D 41/008* (2013.01); *F02D 41/045* (2013.01); *F02D 41/22* (2013.01); *F02P 5/152* (2013.01); *F02D 35/021* (2013.01); *F02D 35/023* (2013.01); *F02D 41/18* (2013.01); *F02D 2041/001* (2013.01); *F02D 2200/0404* (2013.01); *F02D 2200/0406* (2013.01); *F02D 2200/1012* (2013.01); *F02D 2200/602* (2013.01); *F02P 5/1528* (2013.01); *Y02T 10/42* (2013.01); *Y02T 10/46* (2013.01)

(58) Field of Classification Search
CPC .... F02D 41/1498; F02D 41/22; F02P 5/152; F02P 1/1528
USPC ........................ 701/101, 102, 103, 104, 105; 123/406.13, 406.45
See application file for complete search history.

(56) References Cited

U.S. PATENT DOCUMENTS

| | | | |
|---|---|---|---|
| 6,971,360 | B2 | 12/2005 | Katayama |
| 7,533,651 | B2 | 5/2009 | Surnilla |
| 8,156,923 | B2 | 4/2012 | Lorenz et al. |
| 8,171,912 | B2 | 5/2012 | Glugla et al. |
| 8,347,852 | B2 | 1/2013 | Glugla et al. |

(Continued)

OTHER PUBLICATIONS

Partial Translation of Office Action of Chinese Application No. 2012102735573, Issued Jul. 2, 2015, State Intellectual Property Office of PRC, 9 Pages.

*Primary Examiner* — Mahmoud Gimie
(74) *Attorney, Agent, or Firm* — Julia Voutyras; Alleman Hall McCoy Russell & Tuttle LLP

(57) ABSTRACT

Methods are provided for controlling an engine in response to a pre-ignition event. A pre-ignition threshold and a pre-ignition mitigating action are adjusted based on a rate of change of cylinder aircharge. As a result, pre-ignition events occurring during transient engine operating conditions are detected and addressed different from pre-ignition events occurring during steady-state engine operating conditions.

20 Claims, 7 Drawing Sheets

(51) Int. Cl.
  *F02D 41/18*  (2006.01)
  *F02D 35/02*  (2006.01)

(56) References Cited

U.S. PATENT DOCUMENTS

| | | | |
|---|---|---|---|
| 8,463,533 B2 | 6/2013 | Glugla et al. | |
| 2004/0099237 A1 | 5/2004 | Katayama | |
| 2005/0056254 A1* | 3/2005 | Wozniak | F02P 5/1525 123/406.13 |
| 2007/0215101 A1 | 9/2007 | Russell et al. | |
| 2007/0215111 A1 | 9/2007 | Surnilla | |
| 2007/0215130 A1 | 9/2007 | Shelby et al. | |
| 2011/0093186 A1 | 4/2011 | Hagari et al. | |
| 2011/0139118 A1 | 6/2011 | Glugla et al. | |
| 2011/0139120 A1 | 6/2011 | Rollinger et al. | |
| 2011/0144893 A1 | 6/2011 | Rollinger et al. | |
| 2011/0181007 A1 | 7/2011 | Caruso et al. | |
| 2011/0202260 A1 | 8/2011 | Cunningham et al. | |
| 2011/0265761 A1 | 11/2011 | Amann et al. | |
| 2012/0245827 A1 | 9/2012 | Glugla et al. | |

* cited by examiner

| Nature of Pre-ignition | Pre-ignition suppressing fluid injection |
|---|---|
| Transient PI | ▮  ▮ |
| Intermittent PI | ▮▮ |
| Persistent PI | ▮▮▮ |

FIG. 7

| Nature of Pre-ignition | PI suppressing fluid injection | |
|---|---|---|
| | Intake stroke | Comp. stroke |
| Transient PI | ▮  ▮ | |
| Intermittent PI | ▮ | ▮ |
| Persistent PI | ▮ | ▮▮ |

FIG. 8

METHOD AND SYSTEM FOR PRE-IGNITION CONTROL

CROSS REFERENCE TO RELATED APPLICATIONS

The present application claims priority to U.S. patent application Ser. No. 13/197,284, "METHOD AND SYSTEM FOR PRE-IGNITION CONTROL," filed on Aug. 3, 2011, now U.S. Pat. No. 8,666,637, the entire contents of which are hereby incorporated by reference for all purposes.

FIELD

The present description relates generally to methods and systems for controlling a vehicle engine to reduce the occurrence of pre-ignition.

BACKGROUND/SUMMARY

Under certain operating conditions, engines that have high compression ratios, or are boosted to increase specific output, may be prone to low speed pre-ignition combustion events. The early combustion due to pre-ignition can cause very high in-cylinder pressures, and can result in combustion pressure waves similar to combustion knock, but with larger intensity. Strategies have been developed for prediction and/or early detection of pre-ignition based on engine operating conditions. Additionally, following detection, various pre-ignition mitigating steps may be taken.

One example strategy for pre-ignition detection and mitigation is shown by Rollinger et al. in US2011/0139120. Therein, pre-ignition is indicated based on a knock intensity and timing, and in response to the indication of pre-ignition, a cylinder enrichment is performed. Further, in response to frequent pre-ignition occurrence, persistent pre-ignition is inferred and mitigated with a more aggressive enrichment strategy as compared to intermittent pre-ignition.

However, the inventors herein have identified a potential issue with such an approach. During transient engine operating conditions, such as during a tip-in when boost is being phased in, rapid changes in cylinder aircharge can result in heavy knocking events. That is, the intensity and frequency of knocking may be higher for a given cylinder during transient conditions as compared to steady-state conditions. The heavy knocking may be incorrectly perceived as persistent pre-ignition and mitigated with too much (or too frequent) enrichment. As such, this may lead to an unintentional increase in exhaust emissions. Additionally, fuel economy may be degraded.

Thus, in one example, the above issue may be at least partly addressed by a method for an engine, comprising, adjusting a cylinder pre-ignition mitigating action based on a rate of change of a parameter indicative of cylinder aircharge. In addition to the mitigating action, a cylinder pre-ignition threshold may also be adjusted based on the rate of change of the parameter indicative of cylinder aircharge. In this way, frequent knocking during transient conditions may be better differentiated from a pre-ignition event.

In one example, during engine operation, an engine controller may estimate a change in air mass (or aircharge) over time. A pre-ignition threshold used during steady-state engine operating conditions may be adjusted to a pre-ignition threshold used during transient engine operating conditions using a multiplier that is a function of the estimated change in cylinder aircharge over time. In response to an indication of pre-ignition (e.g., a cylinder knock intensity) being higher than the adjusted threshold, transient pre-ignition may be inferred. In comparison, if the indication of pre-ignition is lower than the adjusted threshold, heavy knocking due to the rapid change in cylinder aircharge during the transient conditions may be inferred. Likewise, pre-ignition mitigating actions (e.g., enrichment and/or lead-limiting) may be adjusted based on the presence of transient operating conditions. Specifically, mitigating actions responsive to transient pre-ignition may be limited only to the affected cylinder and may be not extended to other cylinders or cylinder groups, as may be done responsive to (intermittent or persistent) steady-state pre-ignition. Optionally, engine transients may be reduced to further mitigate the transient pre-ignition.

In this way, large knocking events caused due to transient or tip-in detonation may be better distinguished from those caused due to transient pre-ignition. By reducing the false detection of pre-ignition during transient conditions, unnecessary cylinder enrichment may be reduced. As a result, fuel economy and engine exhaust emissions may be improved, without degrading the accuracy of pre-ignition detection.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 7-8 show example cylinder pre-ignition suppressing fluid injections, according to the present disclosure

DETAILED DESCRIPTION

Figure 1:
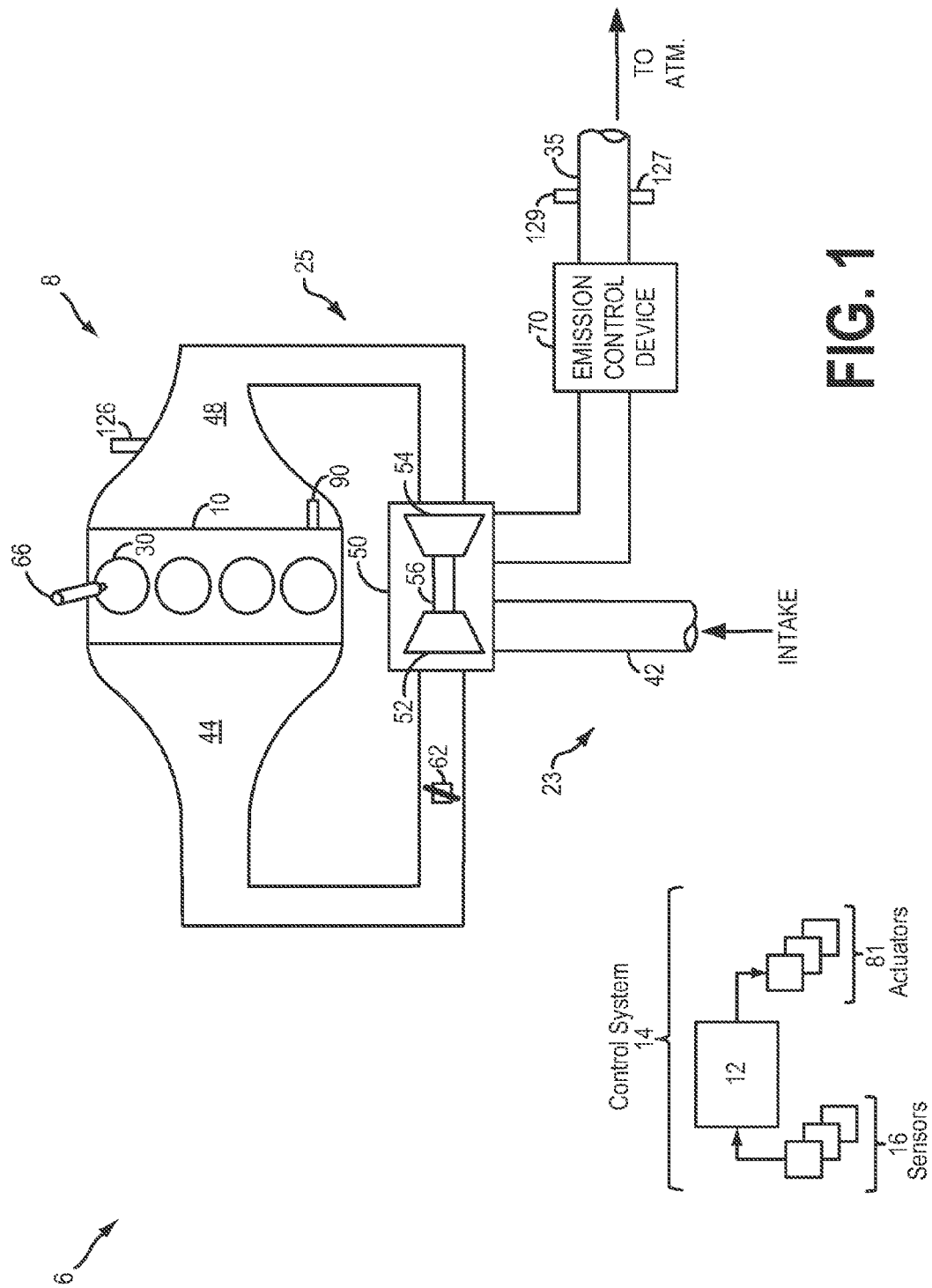
FIG. 1 shows an example engine system.
Figure 2:
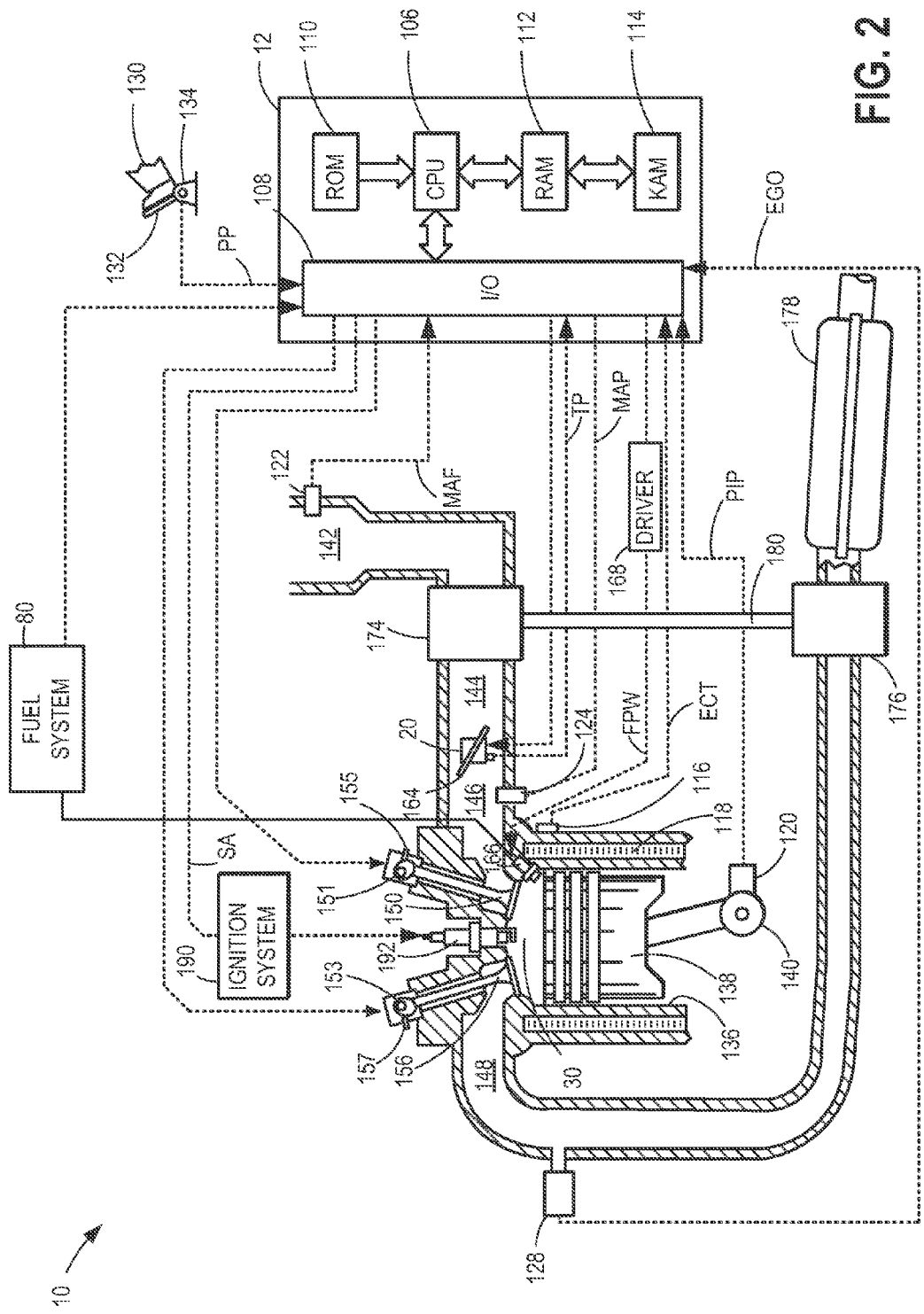
FIG. 2 shows an example combustion chamber.

The following description relates to systems and methods for adjusting the detection and mitigation of pre-ignition in an engine, such as the engine system of FIGS. 1-2, based on a rate of change of a parameter indicative of cylinder aircharge. In this way, heavy knocking during transient engine operating conditions may be better differentiated from actual pre-ignition events. An engine controller may be configured to perform control routines, such as the example routines of FIGS. 3-4, to adjust a cylinder pre-ignition threshold as well as a pre-ignition mitigating action (such as, an enrichment and/or a load-limiting) based on the estimated rate of change of cylinder aircharge. An example cylinder operation is illustrated herein with reference to FIG. 5. The engine controller may be further configured to adjust the injection (e.g., timing, number of injections, split ratio, etc.) of a pre-ignition suppressing fluid in response to an indication of pre-ignition based on whether the pre-ignition is transient, intermittent, or persistent in nature. Example cylinder injections are illustrated herein with reference to FIGS. 7-8. By improving the detection of transient pre-ignition, wasteful fuel enrichment due to intense knocking during transient engine operating conditions may be reduced. By adjusting the pre-ignition mitigating action, such as a pre-ignition suppressing fluid injection, based on whether the pre-ignition is during transient or steady-state conditions, the pre-ignition suppressing action of the injected fluid can be improved and further pre-ignition can be reduced.

FIG. 1 shows a schematic depiction of a vehicle system 6 including an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger, and upstream of an after-cooler (not shown). As such, the after-cooler may be configured to reduce the temperature of the intake air compressed by the boosting device. Turbocharger 50 may include a compressor 52, arranged between intake passage 42 and intake manifold 44. Compressor 52 may be at least partially powered by exhaust turbine 54, arranged between exhaust manifold 48 and exhaust passage 35, via turbine shaft 56.

Engine exhaust 25 may include one or more emission control devices 70, which may be mounted in a close-coupled position in the exhaust. One or more emission control devices may include a three-way catalyst, lean NOx filter, SCR catalyst, PM filter, etc.

Engine system 8 may further include one (as depicted) or more knock sensors 90 distributed along engine block 11. When included, the plurality of knock sensors may be distributed symmetrically or asymmetrically along the engine block. Knock sensor 90 may be an accelerometer, or an ionization sensor.

In one example, an engine controller may be configured to detect and differentiate abnormal combustion events due to cylinder knocking from those indicative of cylinder pre-ignition based on the output (e.g., signal timing, amplitude, intensity, frequency, etc.) of the one or more knock sensors 90. In one example, a cylinder pre-ignition event may be determined based on a cylinder knock signal estimated in a first, earlier window being larger than a first, higher threshold, while a cylinder knock event may be determined based on a cylinder knock signal estimated in a second, later window being larger than a second, lower threshold. In one example, the windows in which the knock signals are estimated may be crank angle windows.

Figure 3:
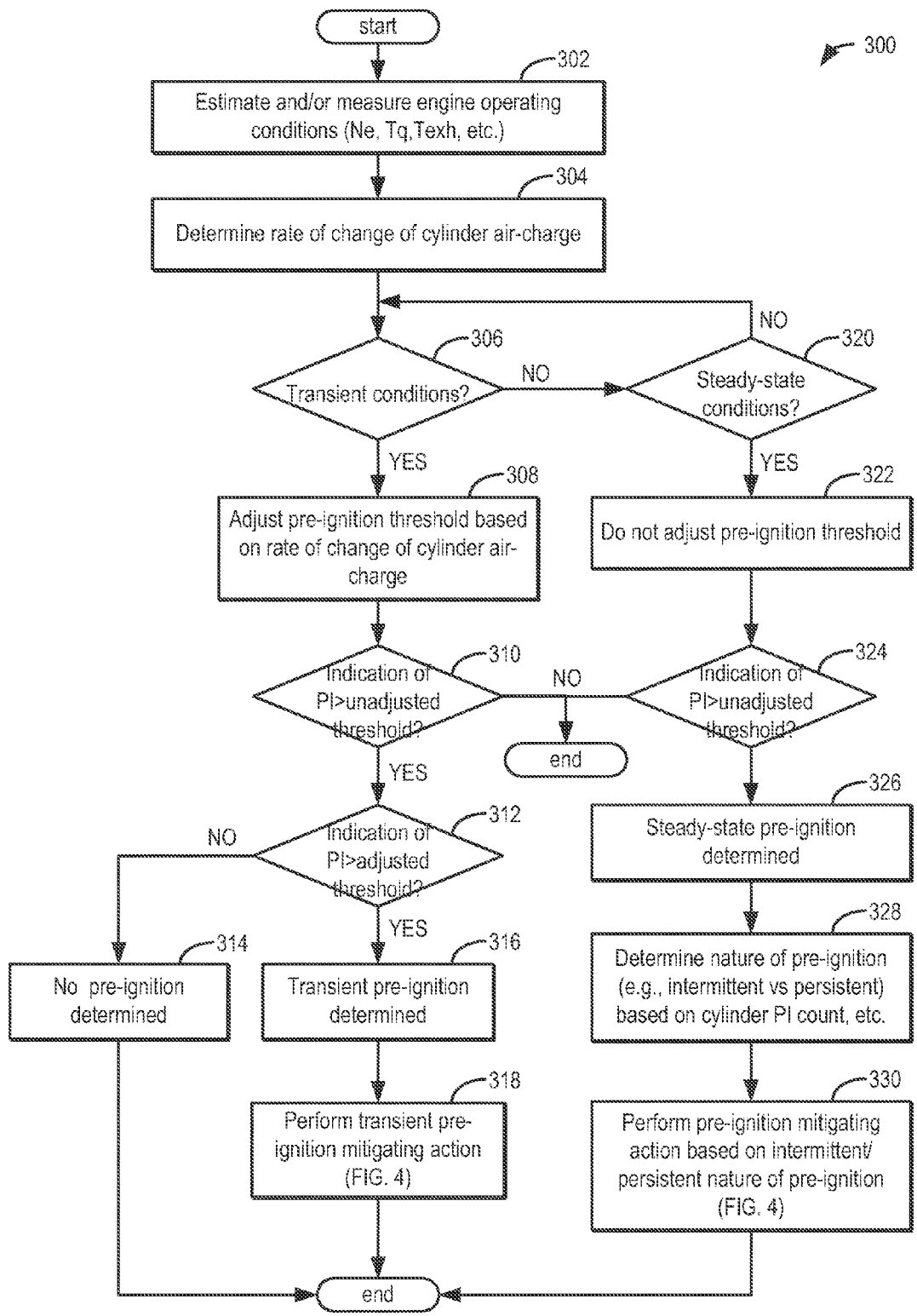
FIG. 3 shows a high level flow chart for adjusting a cylinder pre-ignition mitigating action, and a pre-ignition threshold based on transient or steady-state engine operating conditions.

In another example, as elaborated in FIG. 3, the engine controller may be configured to detect and differentiate abnormal combustion events due to cylinder knocking from those indicative of cylinder pre-ignition during transient or steady-state engine operating conditions based on the output (e.g., signal timing, amplitude, intensity, frequency, etc.) of the one or more knock sensors as well as a rate of change of a parameter indicative of a cylinder aircharge. For example, the controller may infer transient engine operating conditions based on the rate of change of a manifold pressure (MAP), a manifold air flow (MAF), a throttle position or throttle angle, an accelerator pedal or brake pedal position, etc., being higher than a threshold rate. In anticipation of more intense and/or more frequent knocking events, rather than pre-ignition events, during the transient operating conditions (at least due to the rapid change in air mass), the controller may use adjusted knock and pre-ignition thresholds that are higher than the unadjusted knock and pre-ignition thresholds used for detecting knock and pre-ignition during steady-state engine operating conditions (when the rate of change in air mass is substantially lower).

Pre-ignition may be determined based on still other indications of pre-ignition. For example, pre-ignition may be determined based on an in-cylinder pressure (as estimated by a pressure sensor coupled to the cylinder), the output of one or more ionization sensors, and/or a crankshaft acceleration. Based on the rate of change of the parameter indicative of cylinder aircharge at the time when the indication of pre-ignition is received, transient pre-ignition or steady-state pre-ignition may be determined. Likewise, based at least on a cylinder pre-ignition count (or a number of consecutive pre-ignition events over a specified time interval), intermittent or persistent steady-state pre-ignition may be determined and differentiated.

Mitigating actions taken by the engine controller to address knock may also differ from those taken by the controller to address pre-ignition. For example, knock may be addressed using ignition spark timing adjustments (e.g., spark retard) and EGR, while pre-ignition may be addressed using load-limiting, fuel enrichment, fuel enleanment, direct injection of a knock-suppressing fluid (such as water), or combinations thereof. In the same way mitigating actions taken by the controller to address pre-ignition during the transient conditions may differ from those taken during the steady-state conditions. For example, transient pre-ignition may be addressed by enriching only the affected cylinder while during steady-state pre-ignition, one or more other cylinders may also be enriched in addition to the affected cylinder, as elaborated in FIG. 4. Further still, the enrichment may be adjusted based on whether the steady-state pre-ignition is intermittent or persistent. For example, a more aggressive mitigation approach may be used in response to persistent pre-ignition with the enrichment of a pre-ignition affected cylinder and cylinder group as well as the unaffected cylinder group. Likewise, an engine load of the affected cylinder and cylinder group may be limited during intermittent pre-ignition while the engine load of all the cylinder groups (pre-ignition affected and unaffected) may be limited during persistent pre-ignition. In comparison, during transient pre-ignition, the engine load may be maintained and no load limiting may be used.

Figure 6:
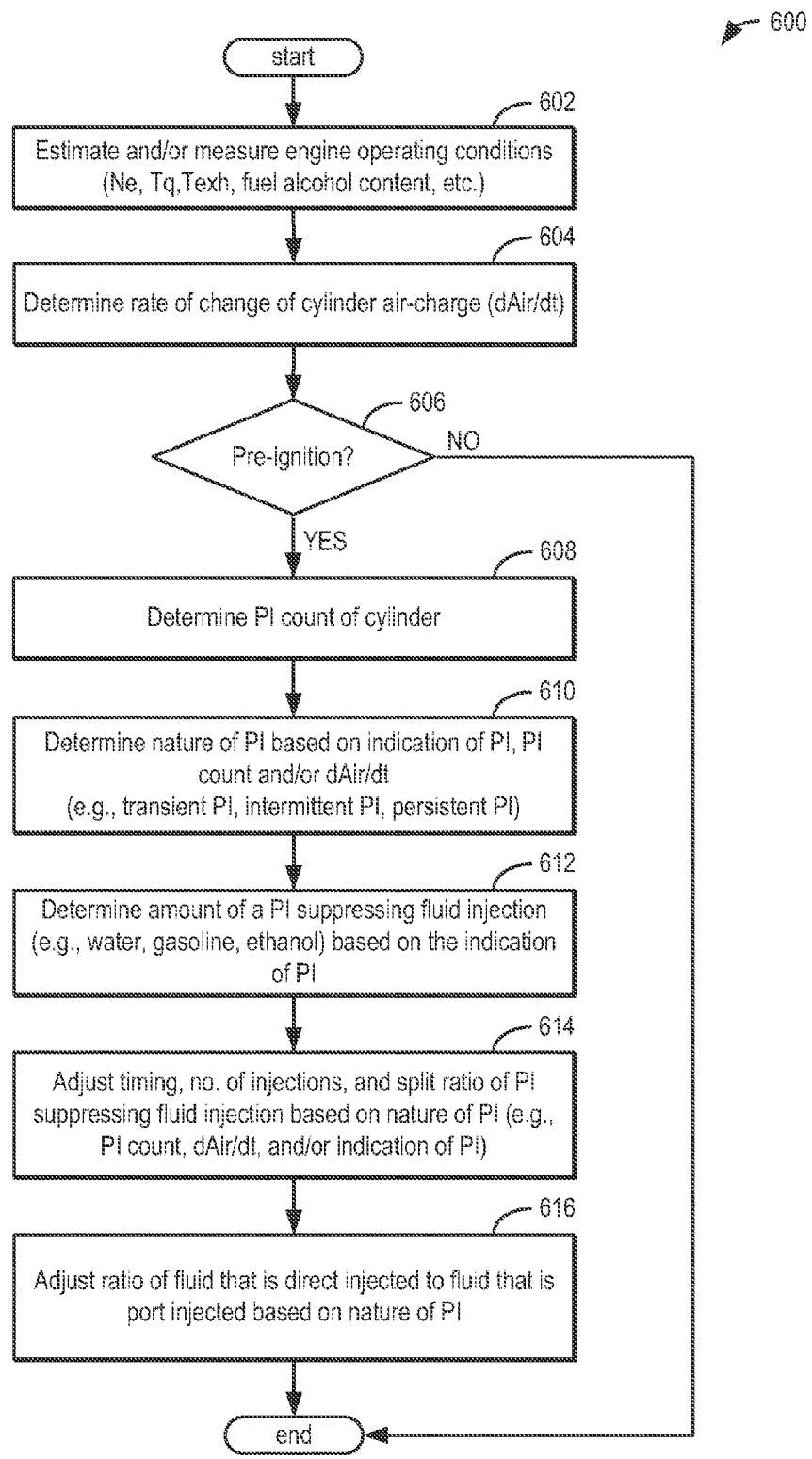
FIG. 6 shows a high level flow chart for adjusting a cylinder pre-ignition suppressing fluid injection in response to transient pre-ignition, intermittent pre-ignition or persistent pre-ignition.

In still further embodiments, as elaborated in FIG. 6, the knock-suppressing fluid that is injected responsive to the pre-ignition, as well as the injection of the fluid (e.g., the timing of the injection, the number of injections in a given engine cycle, the amount/proportion of the fluid injected during an intake stroke relative to a compression stroke, the amount/proportion of fluid direct injected into the cylinder relative to an amount port injected into the cylinder, etc.) may be adjusted based on the nature of the pre-ignition. For example, as illustrated with reference to FIGS. 7-8, a larger number of injections with a shorter duration between consecutive injections may be used to mitigate persistent pre-ignition while a smaller number of injections with a longer duration between consecutive injections may be used to mitigate transient pre-ignition. Likewise, a larger proportion of the injected fluid may be injected earlier in an engine cycle (e.g., in an intake stroke) to mitigate transient pre-ignition while a larger proportion of the injected fluid may be injected later in an engine cycle (e.g., in a compression stroke) to mitigate persistent pre-ignition.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), knock sensor(s) 90, temperature sensor 127, and pressure sensor 129 (located downstream of emission control device 70). Other sensors such as pressure, temperature, air/fuel ratio, composition, ionization sensors, etc., may be coupled to various locations in the vehicle system 6, as discussed in more detail herein. As another example, the actuators may include fuel injectors 66, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with reference to FIGS. 3-4 and 6.

FIG. 2 depicts an example embodiment of a combustion chamber or cylinder of internal combustion engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 80 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

It will also be appreciated that while in one embodiment, the engine may be operated by injecting a variable fuel blend or knock/pre-ignition suppressing fluid via a single direct injector; in alternate embodiments, the engine may be operated by using two injectors (a direct injector 166 and a port injector) and varying a relative amount of injection from each injector.

Fuel may be delivered by the injector to the cylinder during a single engine cycle of the cylinder. Further, the distribution and/or relative amount of fuel or knock/pre-ignition suppressing fluid delivered from the injector may vary with operating conditions (in particular, the rate of change of a cylinder aircharge), as well as a nature of the pre-ignition (such as, transient or intermittent or persistent pre-ignition). Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such each cylinder may similarly include its own set of intake/exhaust valves, fuel injector(s), spark plug, etc.

Fuel tanks in fuel system 80 may hold fuel or knock/pre-ignition suppressing fluids with different qualities, such as different compositions. These differences may include different alcohol content, different water content, different octane, different heat of vaporizations, different fuel blends, and/or combinations thereof etc. In one example, fuels or knock/pre-ignition suppressing fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. In yet another example, one of the fluids may include water while the other fluid is gasoline or an alcohol blend. Additionally, the first and second fuels may also differ in other fuel qualities such as a difference in temperature, viscosity, octane number, latent enthalpy of vaporization etc. Still other pre-ignition suppressing fluids may include water, methanol, washer fluid (which is a mixture of approximately 60% water and 40% methanol), etc.

Moreover, fuel characteristics of the fuel or pre-ignition suppressing fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Now turning to FIG. 3, an example routine 300 is shown for detecting steady-state or transient pre-ignition and adjusting engine operations based on the detection of pre-ignition.

At 302, engine operating conditions may be estimated and/or measured. These may include, for example, engine speed, operator torque demand, boost, exhaust temperature, etc. At 304, a rate of change of a parameter indicative of cylinder aircharge may be determined. That is, a derivative of aircharge with respect to time may be determined. In one example, the parameter may include one or more of manifold air pressure (MAP), manifold air flow (MAF), actual cylinder aircharge, a throttle position, a pedal (e.g., accelerator pedal) position, etc. At 306, based on the determined rate of change of the cylinder aircharge, it may be determined whether transient engine operating conditions are prevalent. Specifically, if the rate of change of cylinder aircharge is greater than a threshold rate, transient engine operating conditions may be determined. In comparison, if the rate of change of cylinder aircharge is lower than the threshold rate, steady-state engine operating conditions may be determined.

Based on whether the engine operating conditions are transient or steady-state, a threshold for detecting pre-ignition, as well as a threshold for detecting knock may be adjusted. Specifically, the unadjusted thresholds may be used for detecting and differentiating knock and pre-ignition under steady-state conditions while the adjusted thresholds may be used for detecting and differentiating knock and pre-ignition under transient conditions. As such, a cylinder may be more prone to intense and frequent knocking during transient operating conditions (such as during a tip-in) as compared to steady-state operating conditions due to the rapid change in air mass and flow experienced in the cylinder during the transient conditions. This intense knocking, when compared related to the unadjusted thresholds, may be erroneously inferred as a pre-ignition event and addressed with cylinder enrichment. Thus, to better distinguish heavy knocking from an actual pre-ignition event during transient conditions, adjusted thresholds that are higher than their unadjusted counterparts may be used.

Specifically, if transient engine operating conditions are confirmed, at 308, the routine includes adjusting a cylinder pre-ignition threshold based on the estimated rate of change of cylinder aircharge. The adjustment may include, for example, increasing the pre-ignition threshold as the estimated rate of change of the parameter indicative of cylinder aircharge increases above the threshold rate. The adjusted threshold may be an absolute threshold that is stored in the controller in a look-up table and accessed based on the rate of change of the cylinder aircharge. Alternatively, the threshold may be a relative threshold based on the unadjusted steady-state threshold, for example, as a function of the unadjusted threshold and the rate of change of cylinder aircharge. For example, the controller may use a map that has a rate of change of cylinder aircharge with respect to time as an input. The input may be processed through a 2-D function that is a threshold multiplier against the steady-state threshold to provide an adjusted threshold as the output. For example, when the rate of change over time is 0 (that is, at steady-state engine operating conditions), the multiplier would be 1.0, and at higher rates of change (that is at transient conditions), the multiplier would be greater than 1.0. The knock threshold may also be similarly adjusted. Thus, by increasing the threshold for comparing knock and pre-ignition based on the transient air charge value during a transient change in air mass, heavy knocking experienced during transient conditions may be better distinguished from transient pre-ignition, and appropriately addressed.

At 310, it may be determined if the indication of pre-ignition in the cylinder is higher than the unadjusted (pre-ignition) threshold. In one example, the indication of pre-ignition may be based on a knock intensity, as estimated by a knock sensor such as knock sensor 90 of FIG. 1, as estimated at a predetermined crank angle degree/timing, or in a predetermined crank angle degree/timing window. In another example, the indication of pre-ignition may be based on a crankshaft acceleration (e.g., in $deg/sec^2$). Still other parameters may be used, such as ionization values and in-cylinder pressures. If the indication is not higher than the unadjusted threshold, then the routine may end as no abnormal combustion event is inferred. If yes, then it may be further determined if the indication of pre-ignition in the cylinder is higher than the adjusted (pre-ignition) threshold. If the indication of pre-ignition is higher than the unadjusted threshold but lower than the adjusted threshold, then it may be determined that the abnormal combustion event is a cylinder knocking event and no transient pre-ignition may be determined. Accordingly, no pre-ignition mitigating action may be performed. Rather, a knock mitigating action may be performed. For example, knock may be addressed using an amount of spark retard and/or an amount of EGR. It will be appreciated that in an alternate embodiment, cylinder knocking may be inferred based on the knock intensity being higher than an adjusted knock threshold. If the indication of pre-ignition is higher than the unadjusted pre-ignition threshold and the adjusted pre-ignition threshold, then at 316, a transient pre-ignition event may be inferred and indicated. In response to the cylinder pre-ignition event and the determination of transient pre-ignition, a transient pre-ignition mitigating action may be performed at 318.

If transient engine operating conditions are not confirmed at 306, then at 320, steady-state conditions may be confirmed. Specifically, if the rate of change of cylinder aircharge is lower than the threshold rate, steady-state engine operating conditions may be determined. In one example, a steady-state operating condition may be determined when there is no change in the rate (that is, when the derivative of cylinder aircharge over time is ~1.0). If steady-state conditions are confirmed, then at 322, the pre-ignition and knock thresholds may not be adjusted and at 324, it may be determined if the indication of pre-ignition in the cylinder is higher than the unadjusted (pre-ignition) threshold. In one example, it may be determined if a knock intensity in the cylinder is higher than the unadjusted threshold. If the indication of pre-ignition is not higher than the unadjusted pre-ignition threshold, then no pre-ignition combustion event may be inferred. In one example, a cylinder knocking event may be further determined when the knock intensity during steady-state conditions is lower than the unadjusted pre-ignition threshold. In an alternate example, a cylinder knocking event may be determined when the knock intensity during steady-state conditions is higher than an unadjusted knock threshold (but lower than the unadjusted pre-ignition threshold).

If the indication of pre-ignition in the cylinder is higher than the unadjusted threshold, then at 326, it may be determined that the abnormal combustion event is due to a steady-state pre-ignition event. At 328, the nature of the steady-state pre-ignition may be further determined based on, for example, a cylinder pre-ignition count, a cylinder pre-ignition history, pre-ignition frequency, etc. For example, it may be determined whether the steady-state pre-ignition is intermittent or persistent based on a number of consecutive pre-ignition events. Thus, while the engine is in the steady-state, intermittent pre-ignition may be inferred if the number of consecutive pre-ignition events in the cylinder is lower than a threshold number while persistent pre-ignition may be inferred if the number of consecutive pre-ignition events in the cylinder is higher than a threshold number. In alternate embodiments, a cylinder pre-ignition count may be updated (e.g., increased) after every pre-ignition event and intermittent versus persistent pre-ignition may be determined based on the updated pre-ignition count. In response to the cylinder pre-ignition event and the determination of steady-state (intermittent or persistent) pre-ignition, a steady-state pre-ignition mitigating action may be performed at 330.

Figure 4:
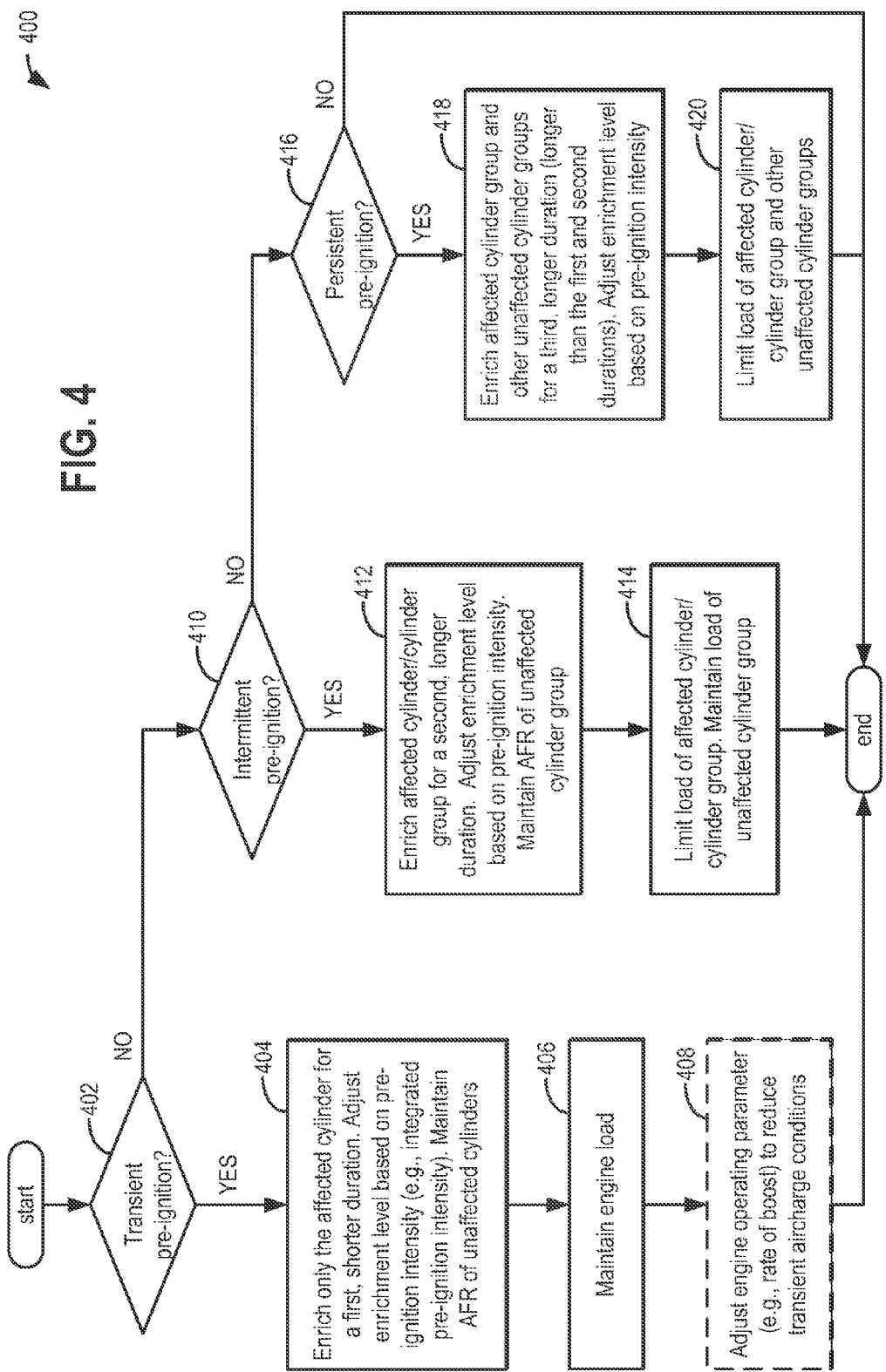
FIG. 4 shows a high level flow chart for adjusting a cylinder pre-ignition mitigating action in response to transient pre-ignition, intermittent pre-ignition or persistent pre-ignition.

As further elaborated in FIG. 4, the cylinder pre-ignition mitigating action performed may also be adjusted based on the rate of change of the parameter indicative of cylinder aircharge. Specifically, the cylinder pre-ignition mitigating action may be adjusted based on whether the pre-ignition is transient pre-ignition or steady-state pre-ignition, and further based on whether the steady-state pre-ignition is intermittent pre-ignition or persistent pre-ignition. For example, at 318, when the rate of change of cylinder aircharge is higher than the threshold rate (that is, in response to transient pre-ignition), the pre-ignition mitigating action may include enriching only the cylinder affected by the pre-ignition event. In comparison, at 330, when the rate of change of cylinder aircharge is lower than the threshold rate (that is, in response to steady-state pre-ignition), the pre-ignition mitigating action may include enriching one or more cylinders other than the cylinder affected by the pre-ignition event. Further, where the engine includes a plurality of cylinders arranged in different cylinder groups, in response to intermittent pre-ignition, the affected cylinder and one or more cylinders on the pre-ignition affected cylinder group may be enriched. In comparison, in response to persistent pre-ignition, the affected cylinder and cylinder group, as well as a pre-ignition unaffected cylinder group may be enriched. In this way, by adjusting a cylinder pre-ignition threshold as well as a pre-ignition mitigating action based on the presence of transient engine operating conditions, erroneous pre-ignition detection and unnecessary cylinder enrichment can be reduced.

Now turning to FIG. 4, an example routine 400 is described for adjusting a pre-ignition mitigating action based on a rate of change of a cylinder aircharge. Specifically, different pre-ignition mitigating actions may be performed in response to transient pre-ignition as compared to (intermittent or persistent) steady-state pre-ignition in an engine including a plurality of cylinders arranged on a first and second cylinder group.

At 402, it may be determined if transient pre-ignition is present in a first cylinder included in the first cylinder group. In one example, transient pre-ignition includes a number of consecutive pre-ignition events in the first cylinder being higher than a threshold while the engine is in a transient state (where the rate of change in cylinder aircharge is higher). Upon confirmation of transient pre-ignition in the first cylinder, the routine includes, at 404, adjusting the enrichment profile of only the first cylinder such that only the first cylinder is enriched. As such, the enrichment in response to transient pre-ignition may be of a shorter duration (e.g., a first shorter duration) while the degree of enrichment in response to the cylinder transient pre-ignition event may be adjusted based on the indication of transient pre-ignition (such as a knock intensity or a knock/pre-ignition sensor output). The duration (e.g., the first shorter duration) may be based on the rate of change of cylinder aircharge during the transient condition. For example, as the rate of change of cylinder aircharge increases above the threshold rate, the duration of enrichment responsive to the transient pre-ignition may be increased. In some embodiments, a degree of the enrichment may also be increased as the rate of change of cylinder aircharge increases above the threshold.

At 406, while the pre-ignition affected cylinder is enriched, an engine load may be maintained in response to the transient pre-ignition. That is, no load-limiting may be performed in the first cylinder. Optionally, at 408, one or more engine operating parameters may be adjusted to reduce transient aircharge conditions. For example, where the engine is a boosted engine, in response to transient pre-ignition, a rate of increase in boost may be reduced, the reduction based on the rate of change of cylinder aircharge. In another example, in response to transient pre-ignition, an intake throttle responsiveness may be reduced, the reduction based on the rate of change of cylinder aircharge. In one example, the throttle may be moved with a gain factor, or adaptive term, that is based on (e.g., a function of) the rate of change of cylinder aircharge, the pre-ignition rate (e.g., pre-ignition transient rate, pre-ignition steady-state rate), or combinations thereof. By adjusting the throttle responsiveness as a function of the rate, the responsiveness of the throttle may be reduced to allow pre-ignition inducing transients to be curbed without making the throttle non-responsive to the operator. In this way, by reducing the occurrence of aircharge transients, the likelihood of further transient pre-ignition can be reduced.

If transient pre-ignition is not confirmed at 402, then at 410, intermittent pre-ignition may be confirmed. In one example, intermittent pre-ignition may include a number of consecutive pre-ignition events in a first cylinder being lower than a threshold while the engine is in a steady-state (where the rate of change in cylinder aircharge is lower). If confirmed, then at 412, in response to intermittent pre-ignition in the first cylinder of the first cylinder group, the routine includes enriching one or more cylinders of the first cylinder group. In one example, only the affected cylinder may be enriched while in an alternate example, all the cylinders of the first cylinder group may be enriched. However, in response to intermittent pre-ignition in the first cylinder of the first cylinder group, the second cylinder group may not be enriched. That is, only the affected cylinder and one or more other cylinders in the affected cylinder group may be enriched, but the unaffected cylinder group may not be enriched. As such, the enrichment in response to intermittent pre-ignition may be of a longer duration (e.g., a second, longer duration) than the enrichment in response to transient pre-ignition while the degree of enrichment in response to the cylinder intermittent pre-ignition event may be adjusted based on the indication of intermittent pre-ignition (such as a knock intensity or a knock/pre-ignition sensor output). In an alternate example, the degree of enrichment in response to intermittent pre-ignition may also be higher than the degree of enrichment in response to transient pre-ignition. Further, the enrichment of the one or more cylinders of the first cylinder group may be the same as the first cylinder. Alternatively, the first affected cylinder may be enriched more than the other cylinders of the affected cylinder group.

At 414, in response to intermittent pre-ignition in the first cylinder, in addition to the enrichment, an engine load of the first cylinder group may be limited while the engine load of the second cylinder group is maintained. That is, load-limiting may be performed only in the first cylinder group affected by the pre-ignition and no load-limiting may be performed in the second cylinder group that in unaffected by the pre-ignition.

If intermittent pre-ignition is not confirmed at 410, then at 416, persistent pre-ignition may be confirmed. In one example, persistent pre-ignition may include a number of consecutive pre-ignition events in the first cylinder being higher than the threshold while the engine is in the steady-state. If confirmed, then at 418, in response to persistent pre-ignition in the first cylinder of the first cylinder group, the routine includes enriching one or more cylinders of each of the first and second cylinder group. Specifically, in response to persistent pre-ignition in the first cylinder of the first cylinder group, the second cylinder group may also be enriched. Herein, by enriching the affected cylinder, one or more other cylinders in the affected cylinder group, as well as one or more cylinders in the unaffected cylinder group, the likelihood of further pre-ignition may be reduced. As such, the enrichment in response to persistent pre-ignition may be of a longer duration than the enrichment in response to transient pre-ignition or intermittent pre-ignition (e.g., a third duration longer than each of the first and second durations) while the degree of enrichment in response to the cylinder persistent pre-ignition event may be adjusted based on the indication of persistent pre-ignition (such as a knock intensity or a knock/pre-ignition sensor output). In an alternate example, the degree of enrichment in response to persistent pre-ignition may also be higher than the degree of enrichment in response to both transient and intermittent pre-ignition. Further, the enrichment of the one or more cylinders of the second cylinder group may be the same as the first cylinder and first cylinder group. Alternatively, the first affected cylinder and first cylinder group may be enriched more than the cylinders of the unaffected second cylinder group.

At 420, in response to the persistent pre-ignition in the first cylinder, in addition to the enrichment, an engine load of each of the first and second cylinder groups may be limited. That is, load-limiting may be extended to the pre-ignition unaffected second cylinder group in response to intermittent pre-ignition in the affected cylinder of the first cylinder group. As used herein, load-limiting may include reducing an amount of boost, adjusting a throttle position to reduce an amount of intake air, and/or adjusting a cam timing of the cylinder group to adjust an amount of aircharge delivered to the cylinders of that cylinder group.

It will be appreciated that while the routines of FIGS. 3-4 suggest enriching a cylinder/cylinder group(s) immediately in response to a (transient, steady-state, intermittent or persistent) pre-ignition combustion event, in alternate embodiments, the pre-ignition count or pre-ignition indication (e.g., knock intensity) may be integrated over a few cycles and when the integrated count or intensity is higher than a threshold, the appropriate enrichment may be initiated. The enrichment may be adjusted to be a function of the integrated count or intensity, at least up to a predetermined saturation point, after which the enrichment may be clipped. By adjusting the enrichment based on the integrated intensity, the amount of enrichment and fuel required may be reduced, providing further fuel economy benefits.

Figure 5:
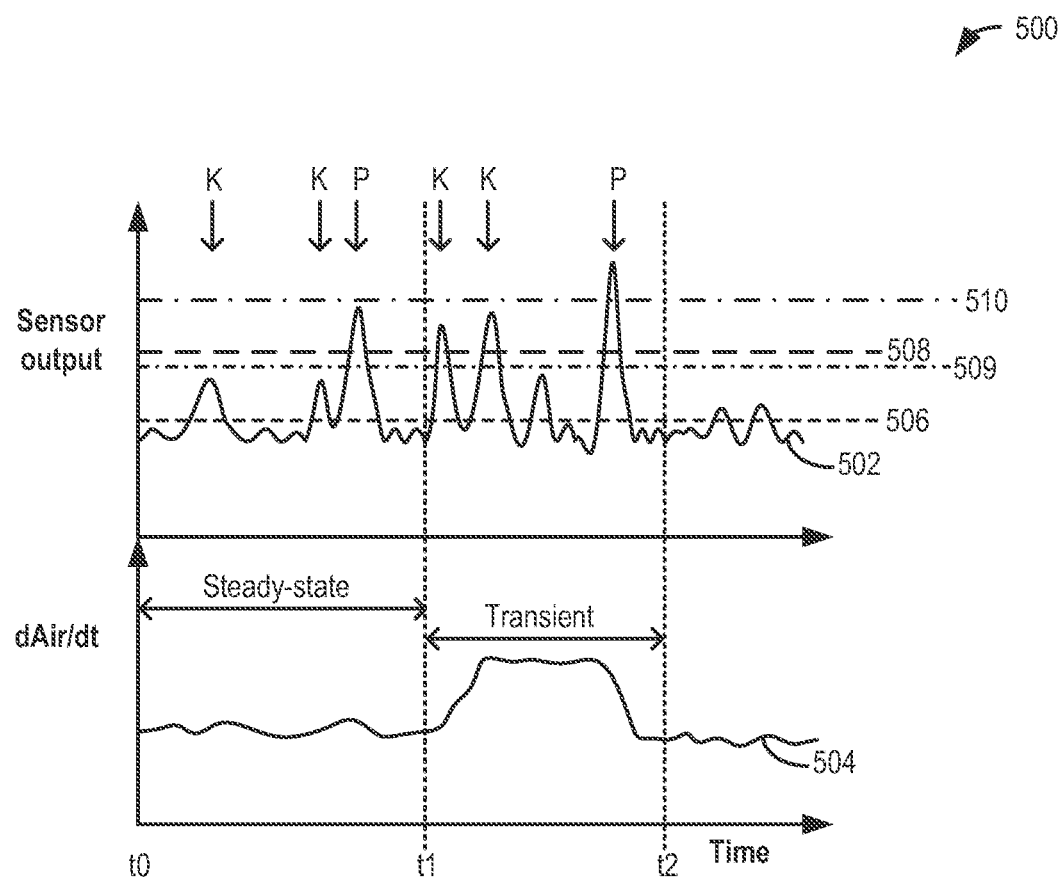
FIG. 5 shows example cylinder pre-ignition events during steady-state and transient engine operating conditions, according to the present disclosure.

Now turning to FIG. 5, map 500 illustrates an example of pre-ignition detection and mitigation during steady-state and transient engine operating conditions. Based on a rate of change of cylinder aircharge, a pre-ignition threshold and a pre-ignition mitigating action may be adjusted so that heavy knocking during transient conditions may be differentiated from transient pre-ignition, while also differentiating pre-ignition during transient conditions from (intermittent or persistent) pre-ignition during steady-state conditions.

Graph 502 depicts the output of a sensor that provides an indication of cylinder pre-ignition. In one example, the sensor is a knock sensor and the indication of cylinder pre-ignition includes a knock intensity. Graph 504 depicts a rate of change of a parameter indicative of a cylinder aircharge (dAir/dt). As shown, between t0 and t1, a first steady-state engine operating condition is shown wherein the rate of change in the cylinder aircharge is lower than a threshold. Between t1 and t2, a second, transient engine operating condition is shown wherein the rate of change in the cylinder aircharge is higher than the threshold. As such, the transient engine operating condition may be a transient condition between the first steady-state engine operating condition (at t0 to t1) and a second steady-state operating condition (after t2).

During the first steady-state engine operating condition (between t0 and t1), a cylinder knock intensity output by a knock sensor may be compared to a set of unadjusted thresholds 506, 508, wherein 506 represents an unadjusted knock threshold and 508 represents an unadjusted pre-ignition threshold. As such, the knock threshold may be lower than the pre-ignition threshold. During the first steady-state condition, when the sensor output is above the unadjusted knock threshold 506, but below the unadjusted pre-ignition threshold, a steady-state knock event (K) may be indicated. In comparison, when the sensor output is above the first unadjusted pre-ignition threshold 508, a steady-state cylinder pre-ignition event (P) may be indicated. In the depicted example, the number of consecutive pre-ignition events during the steady-state operating condition may be lower than a threshold number and the pre-ignition event (P) may be determined to be intermittent steady-state pre-ignition. In an alternate example, the number of consecutive pre-ignition events during the steady-state operating condition may be higher than the threshold number wherein the pre-ignition event (P) may be determined to be persistent steady-state pre-ignition.

During the second transient engine operating condition (between t1 and t2), in response to the rate of change of cylinder aircharge being higher than a threshold, at least the pre-ignition threshold may be adjusted to a second threshold 510. As such, the adjusted pre-ignition threshold 510 may be higher than the first unadjusted pre-ignition threshold 508 and may be based on, for example, the first pre-ignition threshold 508 and a rate of change in the cylinder aircharge (e.g., the slope of graph 504 between t1 and t2). In some embodiments, in addition to the pre-ignition threshold, the knock threshold may also be adjusted. For example, the adjusted knock threshold 509 may be higher than the first unadjusted knock threshold 506 and may be based on, for example, the first knock threshold 506 and a rate of change in the cylinder aircharge. While the depicted example illustrates the adjusted knock threshold 509 as being lower than the unadjusted pre-ignition threshold 508, in alternate embodiments, the adjusted knock threshold 509 may be higher than the unadjusted pre-ignition threshold 508. However, the adjusted knock threshold 509 is lower than the adjusted pre-ignition threshold 510.

As illustrated, during the second transient operating condition, a cylinder knock intensity output by the knock sensor is compared to the set of adjusted thresholds 509, 510 to provide an indication of knock or pre-ignition. Herein, during the second transient condition, when the sensor output is above the adjusted knock threshold 509 but below the adjusted pre-ignition threshold 510, a transient knock event (K) may be indicated. That is, during transient conditions, no cylinder pre-ignition event is indicated even when the sensor output is above the first unadjusted pre-ignition threshold 508. Rather, when the sensor output is above the second, higher adjusted pre-ignition threshold 510, a transient cylinder pre-ignition event (P) is indicated. In this way, by adjusting a pre-ignition threshold for a cylinder based on a rate of change of aircharge of the cylinder, and by further indicating transient pre-ignition in the cylinder in response to an indication of pre-ignition in the cylinder being higher than the adjusted threshold, the detection of transient pre-ignition can be improved.

The mitigating actions can also be appropriately adjusted based on the nature of the detected abnormal combustion event. For example, knock may be mitigated using spark retard and/or EGR. In comparison, pre-ignition may be mitigated based on the nature of the pre-ignition. In one example, in response to transient pre-ignition in a first cylinder, pre-ignition may be mitigated by enriching only the first cylinder while maintaining an engine load. If the engine is a boosted engine, pre-ignition may be further mitigated by reducing a rate of increase of engine boost and/or throttle responsiveness. In another example, where the engine includes a first and a second cylinder group, the first cylinder included in the first cylinder group, in response to steady-state pre-ignition in the first cylinder, pre-ignition may be mitigated by enriching and load-limiting the first cylinder group and not the second cylinder group when the pre-ignition is intermittent. In another example, in response to steady-state pre-ignition in the first cylinder, pre-ignition may be mitigated by enriching and load-limiting each of the first cylinder group and the second cylinder group when the pre-ignition is persistent. Thus, a more aggressive approach may be used to mitigate persistent pre-ignition as compared to intermittent pre-ignition, and a more aggressive approach may be used to mitigate intermittent pre-ignition as compared to transient pre-ignition.

In this way, the same indication of pre-ignition (e.g., the same knock intensity) may be inferred as a pre-ignition event during one condition (e.g., a steady-state operating condition) but may be inferred as a knocking event during another condition (e.g., a transient operating condition). By adjusting the thresholds for knock and/or pre-ignition detection based on the rate of change of a cylinder aircharge, heavy knocking during transient conditions may be better distinguished from an actual pre-ignition event. The improved detection may allow the mitigation to also be improved.

Now turning to FIG. 6, an example routine 600 is shown for adjusting a pre-ignition suppressing fluid injection in response to an indication of pre-ignition based on whether the pre-ignition occurred during transient or steady-state conditions. By varying the adjustment based on the nature of the pre-ignition, the pre-ignition mitigating effect of the injected fluid can be improved.

At 602, engine operating conditions may be estimated and/or measured. These may include, for example, engine speed, operator torque demand, boost, exhaust temperature, etc. Further, a level of fuel available in the fuel tanks, as well as a composition (e.g., alcohol content) of the available fuels (or fluids) may be determined. At 604, a rate of change of a parameter indicative of cylinder aircharge may be determined (dAir/dt). As previously elaborated with reference to FIG. 4, based on the rate of change being higher than a threshold, a transient engine operating condition may be determined and a pre-ignition threshold may be adjusted. Alternatively, based on the rate of change being lower than the threshold, a steady-state engine operating condition may be determined and a pre-ignition threshold may remain unadjusted.

At 606, it may be determined if pre-ignition has occurred. As elaborated with reference to FIG. 4, pre-ignition may be determined if an indication of pre-ignition (e.g., a cylinder knock intensity, ionization, in-cylinder pressure, etc.) is higher than a threshold. The threshold may be the adjusted or unadjusted pre-ignition threshold based on whether the engine operating conditions are transient or steady-state, respectively. If pre-ignition is confirmed, then at 608, a cylinder (and/or engine) pre-ignition (PI) count may be determined and/or updated. The cylinder pre-ignition count may include a trip PI count, providing an estimate of a total number of pre-ignition events in the cylinder over the present trip, or engine cycle, and a lifetime PI count providing an estimate of a total number of pre-ignition events in the cylinder over the lifetime of cylinder operation. In the same way, an engine lifetime PI count and an engine trip PI count may also be obtained. The PI count may also reflect a number of consecutive pre-ignition events in the cylinder over a specified duration (e.g., over a number of engine cycles, a number of trips, etc.). As such, the pre-ignition count may reflect the cylinder's pre-ignition history and may correlate with each cylinder's propensity for further pre-ignition. Thus, based on a cylinder's PI count, as well as prevalent engine operating conditions (e.g., rate or change of cylinder aircharge), a cylinder's propensity for further pre-ignition may be estimated, and used to determine how to adjust the injection profile of a pre-ignition suppressing fluid to the engine.

At 610, based on the determined rate of change of the cylinder aircharge, the indication of pre-ignition, and/or the cylinder PI count, the nature of the pre-ignition event may be determined. For example, in response to an indication of cylinder pre-ignition being higher than a threshold (e.g., an adjusted threshold), and/or a number of consecutive pre-ignition events in a cylinder (or a cylinder PI count) being higher than a threshold, while the rate of change of the cylinder aircharge is higher than a threshold, a transient pre-ignition condition may be determined. In another example, in response to an indication of cylinder pre-ignition being higher than a threshold (e.g., an unadjusted threshold), and/or a number of consecutive pre-ignition events in a cylinder (or a cylinder PI count) being higher than a threshold, while the rate of change of the cylinder aircharge is lower than the threshold, a persistent steady-state pre-ignition may be determined. In comparison, intermittent steady-state pre-ignition condition may be determined during steady-state conditions when the number of consecutive pre-ignition events in the cylinder (or cylinder PI count) is lower than the threshold.

At 612, a pre-ignition suppressing fluid injection amount to be injected into the pre-ignition affected cylinder may be determined. The controller may first determine which fluid to inject to suppress the pre-ignition based on the fuels (or fluids) available in the fuel tanks, their fuel composition, and their fuel levels. As such, the controller may prefer to inject a fluid having a higher water content or a higher gasoline content (as compared to a higher alcohol content) due to the dilution and octane effect of water and/or gasoline, which enable a higher pre-ignition mitigating effect. Thus in one example, if a higher amount of water is available, the controller may direct inject water to suppress pre-ignition. In another example, if a higher amount of gasoline is available, the controller may direct inject gasoline to suppress pre-ignition. Further still, the controller may direct inject some water and some gasoline. In still another example, based on the alcohol content of the available fuels, the controller may inject the fuel having the lower alcohol concentration to suppress the pre-ignition. As such, since each fluid has a different dilution effect and octane effect that contributes to pre-ignition mitigation, based on the available fluids and their respective pre-ignition mitigating properties, an amount of fluid to be injected may be determined.

At 614, the profile for the pre-ignition suppressing fluid injection may be determined based on the nature of the pre-ignition, that is, whether the indication of pre-ignition in the cylinder is transient, intermittent, or persistent. Specifically, the controller may adjust a timing and number of injections, in a given engine cycle, of the pre-ignition suppressing fluid injection to the pre-ignition affected cylinder based on the nature of pre-ignition. Likewise, a split ratio of the pre-ignition suppressing fluid injection may also be adjusted. Herein, the split ratio refers to an amount of fluid injected earlier in an engine cycle (e.g., during an intake stroke) relative to an amount injected later in the same engine cycle (e.g., during a compression stroke).

At 616, a ratio of fluid (or fuel) that is direct injected into the cylinder via a direct injector relative to fluid that is port injected into the cylinder via a port injector is determined based on the nature of the pre-ignition. In one example, a portion of the pre-ignition suppressing fluid injection to be direct injected may be determined and the remaining portion may be port injected.

In one example, based on an indication of transient pre-ignition, the number of injections in the given engine cycle may be increased as the rate of change in the parameter indicative of cylinder aircharge increases above the threshold. A duration between consecutive injections in the given engine cycle may also be based on the rate of change of cylinder aircharge. As another example, the injection timing may be adjusted (e.g., advanced or retarded) into a transient pre-ignition reducing injection timing, the transient pre-ignition reducing injection timing based on the rate of change in the parameter indicative of cylinder aircharge and/or the PI count. As yet another example, where the number of injections includes at least an injection during a compression stroke of the engine and at least an injection during an intake stroke of the engine, adjusting the split ratio of the injection in response to the indication of transient pre-ignition may include decreasing an intake stroke injection amount relative to a compression stroke injection amount, the split ratio based on the rate of change in the parameter indicative of cylinder aircharge. Likewise, where a portion of the pre-ignition suppressing fluid injection is direct injected to the cylinder and a remaining portion is port injected to the cylinder, a ratio of direct injected fuel relative to port injected fuel may be adjusted (e.g., increased) based on the rate of change in the parameter indicative of cylinder aircharge in response to the indication of transient pre-ignition.

As such, in response to transient pre-ignition, the pre-ignition suppressing fluid injected may be injected only in the pre-ignition affected cylinder. That is, the injection may not be extended to other cylinders in the engine. Further, the adjustment may be performed for a number of combustion events since the indication of transient pre-ignition, the number of combustion events based on the rate of change of the parameter indicative of cylinder aircharge. Thus, as the intensity or duration or frequency of transient pre-ignition increases, the split, multiple pre-ignition suppressing fluid injection may be continued for a larger number of combustion events. In one example, where the injected fluid is a fuel, the injection may be a rich injection wherein a degree of the enrichment is based on the rate of change in the parameter indicative of cylinder aircharge (as previously elaborated in FIGS. 3-4).

In comparison, in response to an indication of steady-state pre-ignition in the cylinder, the controller may adjust one or more of the timing, number of injections, and split ratio of the pre-ignition suppressing fluid injection based at least on the cylinder pre-ignition count. For example, the controller may increase a number of injections while decreasing a duration between consecutive injections in the cylinder as the pre-ignition count of the cylinder increases above a threshold count. Thus, the injection profile may be adjusted to enable a more aggressive use of the pre-ignition suppressing fluid injection during persistent pre-ignition as compared to intermittent pre-ignition, and likewise during intermittent pre-ignition as compared to transient pre-ignition.

As an example, in response to transient pre-ignition, the controller may inject a first amount of fuel over a first number of injections, the first number and a duration between the injections based on the rate of change in cylinder aircharge during the transient engine operating conditions. In another example, in response to intermittent pre-ignition, the controller may inject a second, larger amount of fuel over a second number of injections, the second number and a duration between the injections based on a cylinder pre-ignition count. In comparison, in response to persistent pre-ignition, the controller may inject a third amount of fuel over a third number of injections, the third amount larger than each of the first and second amounts, the third number and a duration between the injections based on the cylinder pre-ignition count.

Herein, the injection in response to transient pre-ignition may be continued for a first, smaller number of combustion events since the indication of transient pre-ignition is received, while the injection in response to intermittent pre-ignition is continued for a second, larger number of combustion events since the indication of intermittent pre-ignition is received and the injection in response to persistent pre-ignition is continued for a third number of combustion events since the indication of persistent pre-ignition is received.

In the same way, and as elaborated with reference to FIG. 4, in response to transient pre-ignition in a first cylinder (wherein the first cylinder is included in a first cylinder group of the engine, and the wherein the engine further includes a second cylinder group), the controller may enrich only the first cylinder while maintaining an engine load. In comparison, in response to intermittent pre-ignition in the first cylinder, the controller may enrich and limit an engine load of the first cylinder group, while in response to persistent pre-ignition in the first cylinder, the controller may enrich and limit an engine load of each of the first and second cylinder groups. As such, the degree of enrichment and/or load-limiting responsive to persistent pre-ignition may be higher than the degree of enrichment and/or load-limiting responsive to intermittent pre-ignition, which in turn may be higher than the degree of enrichment and/or load-limiting responsive to transient pre-ignition.

In this way, in response to an indication of transient pre-ignition in a cylinder, by direct injecting a pre-ignition suppressing fluid into the cylinder, a timing, number of injections, and split ratio of the direct injection based on a rate of change of cylinder aircharge during the transient pre-ignition, the transient pre-ignition may be better mitigated. By using a less aggressive pre-ignition mitigating approach in view of the presence of transient engine operating conditions, fuel economy can be improved.

Example adjustments to a knock suppressing fluid injection profile are now shown with reference to the example maps 700-800 of FIGS. 7-8. In each case, based on the nature of the pre-ignition, a pre-ignition suppressing fluid is injected and a timing, number of injections, and split ratio of the injection is adjusted.

Map 700 of FIG. 7 shows a first example wherein a number and timing of the injections is adjusted. Herein, in response to transient pre-ignition (PI), the number of injections may be increased to two symmetric injections wherein each injection has the same injection amount. Additionally, a duration between consecutive injections may be adjusted (e.g., increased) such that the average injection timing is at the same timing as a corresponding single injection of the total amount of fluid. In response to intermittent pre-ignition, the number of injections may also be increased to two symmetric injections wherein each injection has the same injection amount. Herein, due to the intermittent nature of the pre-ignition, a duration between consecutive injections may be adjusted (e.g., decreased relative to transient pre-ignition) such that the average injection timing is at the same timing as a corresponding single injection of the total amount of fluid. Additionally, the average injection timing for the injection responsive to intermittent pre-ignition may be retarded relative to the average injection timing for the injection responsive to transient pre-ignition. In comparison, in response to persistent PI, the number of injections may be further increased (herein, to three symmetric injections) wherein each injection has the same injection amount. Further, due to the persistent nature of the pre-ignition, a duration between consecutive injections may be adjusted (e.g., further decreased relative to transient and intermittent pre-ignition) such that the average injection timing is at the same timing as a corresponding single injection of the total amount of fluid. Additionally, the average injection timing for the injection responsive to persistent pre-ignition may be retarded relative to the average injection timing for the injection responsive to transient pre-ignition as well as intermittent pre-ignition.

It will be appreciated that while the depicted example illustrates split symmetric injections, in alternate embodiments, the different injections may be asymmetric with the first injection amount differing from consecutive injection amounts. In one example, a smaller portion of the total injection amount may be injected in the first split injection to mitigate transient pre-ignition while a larger portion of the total injection amount may be injected in later injections of the split injection to mitigate intermittent or persistent pre-ignition (with the latter portion being higher for persistent as compared to intermittent pre-ignition). It will also be appreciated that while the depicted example illustrates the split injections being injected in the same stroke of an engine cycle, in still other embodiments, the split injections may be injected in a combination of different strokes of a given engine cycle.

One such example is shown in FIG. 8. Map 800 of FIG. 8 shows a first example wherein in response to transient pre-ignition (PI), the number of injections of a pre-ignition suppressing fluid injection is increased, herein to two asymmetric injections wherein the first injection has a higher injection amount than the second injection. Additionally, the two injections are performed within an intake stroke of the engine cycle. In comparison, in response to intermittent pre-ignition, the number of injections is increased, herein also to two asymmetric injections, with the first injection having a smaller injection amount than the second injection. Herein, in addition to decreasing a duration between consecutive injections and retarding an average injection timing relative to the transient pre-ignition timing, the split ratio of the injection is adjusted such that a smaller portion of the injected fluid is injected earlier in a given engine cycle (herein, in the intake stroke) while the remaining larger portion of the injected fluid is injected later in the engine cycle (e.g., in a compression stroke) to mitigate pre-ignition. As another example, in response to persistent pre-ignition, the number of injections is further increased, herein to three asymmetric injections, with the third injection having a higher injection amount than each of the first and second injections. Further, in addition to decreasing a duration between consecutive injections and retarding an average injection timing relative to the transient and intermittent pre-ignition timing, the split ratio of the injection is adjusted such that a further smaller portion of the injected fluid is injected earlier in the given engine cycle (herein, in the intake stroke) while the remaining larger portion of the injected fluid is injected later in the engine cycle (e.g., in a compression stroke) to mitigate pre-ignition. While the depicted example illustrates the injection amount being split between an intake stroke and a compression stroke, still other combinations may be possible.

In this way, the detection of transient pre-ignition and differentiation from intermittent and persistent pre-ignition can be improved. Also, by adjusting the pre-ignition mitigating action (e.g., enrichment, load-limiting and/or injection of a pre-ignition suppressing fluid) based on the nature of the pre-ignition, the pre-ignition mitigating effect can be improved and further pre-ignition can be reduced. By reducing erroneous pre-ignition detection during transient conditions, fuel wastage and degraded exhaust emissions due to unnecessary cylinder enrichment can be reduced. In this way, engine fuel economy and exhaust emissions can also be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
indicating a pre-ignition event in a cylinder when a parameter indicative of a pre-ignition event in the cylinder is above a threshold; and adjusting the threshold and adjusting a cylinder pre-ignition mitigating action based on a rate of change over time of a parameter indicative of aircharge in the cylinder.

2. The method of claim 1, wherein the parameter indicative of aircharge in the cylinder includes one or more of manifold air pressure, manifold air flow, cylinder aircharge, and a throttle position.

3. The method of claim 1, wherein the pre-ignition mitigating action is performed in response to the indication of the pre-ignition event in the cylinder.

4. The method of claim 3, wherein the adjustment of the cylinder pre-ignition mitigating action includes,
when the rate of change is higher than a threshold rate, enriching only the cylinder affected by the pre-ignition event; and
when the rate of change is lower than the threshold rate, enriching one or more cylinders other than the cylinder affected by the pre-ignition event.

5. The method of claim 4, wherein the enrichment when the rate of change is higher than the threshold rate is for a shorter duration than the enrichment when the rate of change is lower than the threshold rate.

6. The method of claim 4, wherein enriching one or more cylinders other than the cylinder affected by the pre-ignition event includes,
enriching one or more cylinders of a pre-ignition affected cylinder group in response to intermittent pre-ignition in the cylinder affected by the pre-ignition event; and
enriching one or more cylinders of the pre-ignition affected cylinder group and a pre-ignition unaffected cylinder group in response to persistent pre-ignition in the cylinder affected by the pre-ignition event.

7. The method of claim 6, wherein the enrichment responsive to intermittent pre-ignition in the cylinder affected by the pre-ignition event is for a shorter duration than the enrichment responsive to persistent pre-ignition in the cylinder affected by the pre-ignition event.

8. The method of claim 7, wherein the adjustment of the cylinder pre-ignition mitigating action further includes,
when the rate of change is higher than the threshold rate, maintaining a load of the pre-ignition affected cylinder; and
when the rate of change is lower than the threshold rate, load-limiting one or more cylinders other than the cylinder affected by the pre-ignition event.

9. The method of claim 8, wherein load-limiting one or more cylinders other than the cylinder affected by the pre-ignition event includes,
in response to intermittent pre-ignition in the cylinder affected by the pre-ignition event, adjusting a cam timing to limit a load of the one or more cylinders on the pre-ignition affected cylinder group; and
in response to persistent pre-ignition in the cylinder affected by the pre-ignition event, adjusting a cam timing to limit the load of the one or more cylinders on the pre-ignition affected cylinder group and the pre-ignition unaffected cylinder group.

10. The method of claim 1, wherein the adjustment of the threshold includes, increasing the threshold as the rate of change of the parameter indicative of cylinder aircharge increases above a threshold rate.

11. A method for an engine, comprising:
adjusting a pre-ignition threshold for a parameter of a first cylinder based on a rate of change over time of aircharge of the first cylinder; and
in response to the parameter being higher than the adjusted pre-ignition threshold, indicating transient pre-ignition in the first cylinder and enriching only the first cylinder while maintaining an engine load.

12. The method of claim 11, further comprising, in response to the parameter being lower than the adjusted pre-ignition threshold but higher than an unadjusted pre-ignition threshold, indicating steady-state pre-ignition in the first cylinder.

13. The method of claim 11, wherein the engine is a boosted engine, further comprising, in response to transient pre-ignition in the first cylinder, reducing a rate of increase of engine boost.

14. The method of claim 12, wherein the engine includes a first and a second cylinder group, the first cylinder included in the first cylinder group, further comprising, in response to steady-state pre-ignition in the first cylinder,
enriching and load-limiting the first cylinder group and not the second cylinder group when a number of consecutive pre-ignition events in the first cylinder is lower than a threshold; and
enriching and load-limiting each of the first cylinder group and the second cylinder group when the number of consecutive pre-ignition events in the first cylinder is higher than the threshold.

15. A method for an engine, comprising:
determining whether pre-ignition in a first cylinder of a first cylinder group is intermittent pre-ignition, persistent pre-ignition, or transient pre-ignition; and
adjusting enrichment of one or more cylinders of the first cylinder group and a second cylinder group based on the determination.

16. The method of claim 15, wherein adjusting enrichment of one or more cylinders of the first cylinder group and the second cylinder group based on the determination comprises:
in response to intermittent pre-ignition in the first cylinder of the first cylinder group, enriching one or more cylinders of the first cylinder group;
in response to persistent pre-ignition in the first cylinder, enriching one or more cylinders in each of the first and the second cylinder groups; and
in response to transient pre-ignition in the first cylinder, enriching only the first cylinder.

17. The method of claim 16, wherein the intermittent pre-ignition includes a number of consecutive pre-ignition events in the first cylinder being lower than a threshold while the engine is in a steady-state, wherein the persistent pre-ignition includes a number of consecutive pre-ignition events in the first cylinder being higher than the threshold while the engine is in the steady-state, and wherein the transient pre-ignition includes a number of consecutive pre-ignition events in the first cylinder being higher than the threshold while the engine is in a transient state.

18. The method of claim 16, further comprising:
in response to intermittent pre-ignition in the first cylinder, limiting an engine load of the first cylinder group;
in response to persistent pre-ignition in the first cylinder, limiting an engine load of each of the first and second cylinder groups; and
in response to transient pre-ignition in the first cylinder, maintaining an engine load.

19. The method of claim 17, wherein the steady-state includes a rate of change of a parameter indicative of cylinder aircharge being lower than a threshold, and wherein the transient state includes a rate of change of a parameter indicative of cylinder aircharge being higher than a threshold.

20. The method of claim 18, wherein the engine is a boosted engine and wherein limiting an engine load includes reducing an amount of boost, further comprising, in response to transient pre-ignition, reducing a rate of increase in boost.

* * * * *